United States Patent
Miyata

(10) Patent No.: US 8,368,905 B2
(45) Date of Patent: Feb. 5, 2013

(54) METHOD AND COMPUTER READABLE MEDIUM FOR PRINTER DRIVER AND INFORMATION PROCESSING DEVICE

(75) Inventor: Yuji Miyata, Aichi (JP)

(73) Assignee: Brother Kogyo Kabushiki Kaisha, Nagoya-shi, Aichi-kn (JP)

( * ) Notice: Subject to any disclaimer, the term of this patent is extended or adjusted under 35 U.S.C. 154(b) by 1051 days.

(21) Appl. No.: 12/128,668

(22) Filed: May 29, 2008

(65) Prior Publication Data

US 2008/0297840 A1 Dec. 4, 2008

(30) Foreign Application Priority Data

May 30, 2007 (JP) ................................ 2007-143620

(51) Int. Cl.
*G06F 15/00* (2006.01)
*G06K 1/00* (2006.01)
(52) U.S. Cl. ........................ 358/1.13; 358/1.1; 358/1.9
(58) Field of Classification Search .................... None
See application file for complete search history.

(56) References Cited

U.S. PATENT DOCUMENTS

| | | | | |
|---|---|---|---|---|
| 7,232,267 | B2 * | 6/2007 | Uchida | 400/62 |
| 2004/0190042 | A1 * | 9/2004 | Ferlitsch et al. | 358/1.15 |
| 2004/0212829 | A1 * | 10/2004 | Uchida | 358/1.15 |
| 2005/0094200 | A1 | 5/2005 | Uekusa et al. | |
| 2006/0028667 | A1 * | 2/2006 | Saito | 358/1.13 |
| 2006/0187479 | A1 | 8/2006 | Kikuchi | |

FOREIGN PATENT DOCUMENTS

| | | |
|---|---|---|
| JP | 2004-326601 | 11/2004 |
| JP | 2005-158051 | 6/2005 |
| JP | 2006-048537 | 2/2006 |
| JP | 2006-228066 | 8/2006 |
| JP | 2007-004332 | 1/2007 |
| JP | 2007-058685 | 3/2007 |

OTHER PUBLICATIONS

Notification of Reasons of Rejection for Japanese Application No. 2007-143620 mailed May 12, 2009.

* cited by examiner

*Primary Examiner* — Thierry Pham
(74) *Attorney, Agent, or Firm* — Banner & Witcoff, Ltd.

(57) ABSTRACT

There is provided a method for providing information from a printer driver. The method comprises the steps of: accepting a request for information concerning the printer driver; inquiring of at least one function filter about function information in accordance with configuration information containing a reference to the at least one function filter, in response to receipt of the request; obtaining, from the at least one function filter, the function information containing at least one current function of the at least one function filter, as a response to the inquiring; and providing the obtained function information for a requesting source of the request.

17 Claims, 8 Drawing Sheets

```
<PAPER SIZE>
  <A4>
  <LETTER>
  <B5>
</PAPER SIZE>
<PAPER ORIENTATION>
  <PORTRAIT>
  <LANDSCAPE>
</PAPER ORIENTATION>
<INPUT TRAY>
  <TRAY 1>
  <TRAY 2>
</INPUT TRAY>
```

FIG. 3

```
<FILTER CONFIGURATION>
  <WATERMARK>
    <DLL NAME> Watermark.DLL </DLL>
  </WATERMARK>
  <REARRANGEMENT>
    <DLL NAME> Order.DLL </DLL>
  </REARRANGEMENT>
  <MULTI-PAGE>
    <DLL NAME> Nup.DLL </DLL>
  </MULTI-PAGE>
</FILTER CONFIGURATION>
```

FIG. 4

```
<WATERMARK>
  <USE>
  <NONUSE>
</WATERMARK>
<WATERMARK COLOR>
  <BLACK>
  <GRAY>
  <RED>
</WATERMARK COLOR>
```

FIG. 6

```
<PAPER SIZE>
  <A4>
  <LETTER>
  <B5>
</PAPER SIZE>
<PAPER ORIENTATION>
  <PORTRAIT>
  <LANDSCAPE>
</PAPER ORIENTATION>
<INPUT TRAY>
  <TRAY 1>
  <TRAY 2>
</INPUT TRAY>
<WATERMARK>
  <USE>
  <NONUSE>
</WATERMARK>
<WATERMARK COLOR>
  <BLACK>
  <GRAY>
  <RED>
</WATERMARK COLOR>
```

FIG. 7

```
<PAPER SIZE>
  <A4>
  <LETTER>
  <B5>
</PAPER SIZE>
<PAPER ORIENTATION>
  <PORTRAIT>
  <LANDSCAPE>
</PAPER ORIENTATION>
<INPUT TRAY>
  <TRAY 1>
  <TRAY 2>
</INPUT TRAY>
<WATERMARK>
  <USE>
  <NONUSE>
</WATERMARK>
<WATERMARK COLOR>
  <BLACK>
  <GRAY>
  <RED>
</WATERMARK COLOR>
<REARRANGEMENT>
  <NORMAL>
  <REVERSE>
  <BOOKLET>
</REARRANGEMENT>
<MULTI-PAGE>
  <1in1>
  <2in1>
  <4in1>
</MULTI-PAGE>
<MULTI-PAGE DIRECTION>
  <FROM UPPER LEFT TO BOTTOM>
  <FROM UPPER LEFT TO RIGHT>
  <FROM UPPER RIGHT TO BOTTOM>
  <FROM UPPER RIGHT TO LEFT>
</MULTI-PAGE DIRECTION>
```

FIG. 8

```
<REARRANGEMENT>
 <NORMAL>
 <REVERSE>
</REARRANGEMENT>
```

METHOD AND COMPUTER READABLE MEDIUM FOR PRINTER DRIVER AND INFORMATION PROCESSING DEVICE

CROSS-REFERENCE TO RELATED APPLICATION

This application claims priority under 35 U.S.C. §119 from Japanese Patent Application No. 2007-143620, filed on May 30, 2007. The entire subject matter of the application is incorporated herein by reference.

BACKGROUND

1. Technical Field

Aspects of the present invention relate to a printer driver program and an information processing device having a function of processing print data.

2. Related Art

Printer Drivers having the functions of processing print data, such as, a rearranging function of rearranging printing order of print target images, a multi-page function of printing a plurality of pages on one sheet, and a watermark function of forming a watermark (e.g., watermark letters) on a print target image have been widely used. Application software having a function of inquiring of a printer driver about functions that the printer driver supports has also been widely used. The application software is able to apply the functions of the printer driver to a user interface thereof by acquiring information concerning the functions of the printer driver from the printer driver. In other words, the printer driver returns the information concerning the functions of the printer driver to the application software.

If a printer driver has a plurality of types of functions of processing print data, different printed images can be created depending on the order of execution of the functions. For example, print data formed by executing the multi-page function (2-in-1 function) and the watermark function in this order is different from print data formed by executing the watermark function and the multi-page function in this order. In Japanese Patent Provisional Publication No. 2006-48537A (hereafter, referred to as JP2006-48537A), a printing system having a function of allowing a user to designate order of execution of functions of processing print data so that a desirable image can be printed has also been proposed.

SUMMARY

The above mentioned the functions of the printer driver are formed as program modules which can be added to or removed from the printer driver. Such functions of the printer driver are called function filters. It is understood that the structure of the function filters are changed by addition, deletion or version upgrade of the function filters.

In JP2006-48537A, it is disclosed that the printer driver displays a user interface screen in which the structure of the function filters is shown. However, it should be understood that the structure of the function filters may be dynamically changed due to various factors (e.g., a user operation). Regarding a reply to an inquiry from an application program, the printer driver disclosed in JP2006-48537A is not able to supply information concerning change of the structure of the function filters to an application program. That is, the printer driver may provide the same information concerning the structure of the function filters regardless of the fact that the structure of the function filters is dynamically changed.

If the printer driver provides the same information even if one of the function filters is removed, the application program erroneously recognizes that the removed function filter is still usable. In this case, a printed image intended by a user can not be formed.

If the printer provides the same information even if a new function filter is added to the printer driver, the application program is not able to obtain information concerning the newly added function filter. In this case, the application program is not able to apply the newly added function filter to its user interface screen.

Aspects of the present invention are advantageous in that at least one of a method, a computer readable medium, and an information processing device capable of providing proper information reflecting current functions of a printer driver as a response to an inquiry from an application program is provided.

According to an aspect of the invention, there is provided a method for providing information from a printer driver. The method comprises the steps of: accepting a request for information concerning the printer driver; inquiring of at least one function filter about function information in accordance with configuration information containing a reference to the at least one function filter, in response to receipt of the request; obtaining, from the at least one function filter, the function information containing at least one current function of the at least one function filter, as a response to the inquiring; and providing the obtained function information for a requesting source of the request.

Such a configuration makes it possible to provide proper function information reflecting current function information of the function filters to a requesting source. That is, it is possible to provide the proper function information in response to a request from the requesting source.

According to another aspect of the invention, there is provided a computer readable medium having computer readable instruction stored thereon, which, when executed by a processor of an information processing device, configures the processor to perform the steps of: accepting a request for information concerning a printer driver; inquiring of at least one function filter about function information in accordance with configuration information containing a reference to the at least one function filter, in response to receipt of the request; obtaining, from the at least one function filter, the function information containing at least one current function of the at least one function filter, as a response to the inquiring; and providing the obtained function information for a requesting source of the request.

Such a configuration makes it possible to provide proper function information reflecting current function information of the function filters to a requesting source. That is, it is possible to provide the proper function information in response to a request from the requesting source.

According to another aspect of the invention, there is provided an information processing device, comprising: at least one function filter having a function of processing print data; a configuration information storage unit configured to store configuration information containing a reference to the at least one function filter; an accepting unit configured to accept a request for information concerning a printer driver; an inquiry unit configured to inquire of the at least one function filter about function information in accordance with the configuration information, in response to receipt of the request by the accepting unit; an information obtaining unit configured to obtain, from the at least one function filter, the function information containing at least one current function of the at least one function filter, as a response to the inquiring by the inquiry unit; and an information providing unit configured to provide the obtained function information for a requesting source of the request.

Such a configuration makes it possible to provide proper function information reflecting current function information of the function filters to a requesting source. That is, it is possible to provide the proper function information in response to a request from the requesting source.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 3 illustrates an example of function information of the printer driver containing only basic function information.

FIG. 4 illustrates an example configuration information managed y a filter information unit.

FIG. 6 illustrates an example of information obtained from a watermark filter which is a first function filter.

FIG. 7 illustrates an example of function information representing a state where functions of the watermark filter are added to the basic function information.

FIG. 8 illustrates an example of the function information in a state where the information has been obtained from all of the function filters.

DETAILED DESCRIPTION

Hereafter, an embodiment according to the invention will be described with reference to the accompanying drawings.

Figure 1:
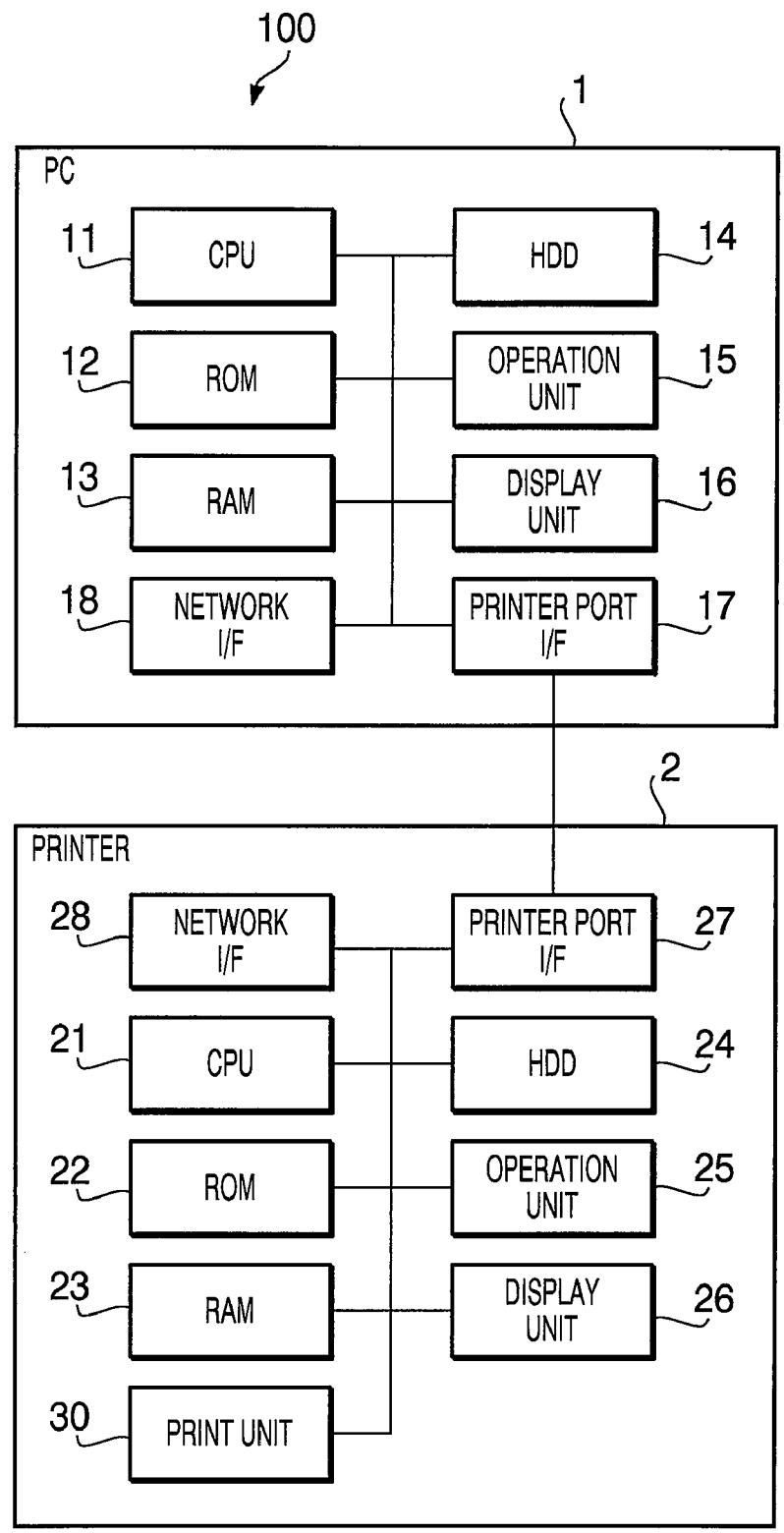
FIG. 1 is a block diagram of a print system according to an embodiment.

FIG. 1 is a block diagram of a print system 100 according to an embodiment. The print system 100 includes a PC (Personal Computer) 1 serving as an information processing device and a printer 2 serving as an image formation device. In the print system 100, the PC 1 and the printer 2 are communicatably connected to each other through a USB cable. Although in FIG. 1 only one printer 2 is illustrated, the print system 100 may be configured to have more than one printer 2. Various types of communication interfaces, such as a USB interface, a serial communication interface, a parallel communication interface, a wired LAN interface, or a wireless LAN interface, may be employed for communication between the PC 1 and the printer 2.

The PC 1 includes a CPU 11, a ROM 12 storing various types of programs including a BIOS, a RAM 13 used as a work memory for the CPU 11, and an HDD (Hard Disk Drive) 14 storing various types of data and programs. Further, the PC 1 includes an operation unit 15 including a keyboard and a mouse, a display unit 16 including a LCD, a printer port interface 17 interfacing the PC 1 with the printer 2, and a network interface 18 interfacing the PC 1 with a network (e.g., the Internet). For example, in the HDD 14, an OS (Operating System), an application for editing image data (e.g., word processing software, drawing software, spreadsheet software, or photographic image editing software), and a printer driver for processing print data to be transmitted to the printer 2 are stored.

The printer 2 includes a CPU 21, a ROM 22 storing programs including a start-up program, a RAM 23 used as a work memory for the CPU 21, and an HDD (Hard Disk Drive) 24 storing various types of data and programs. Further, the printer 2 includes an operation unit 25 including various buttons located on an outer surface of a body case of the printer 2, a display unit 26 including a LCD panel located on the outer surface of the body case of the printer 2, a printer port interface 27 interfacing the printer 2 with the PC 1, and a network interface 28 interfacing the printer 2 with a network (e.g., the Internet).

Further, the printer 2 includes a print unit 30 which forms an image on a recording medium (e.g., a sheet of paper, and an OHP sheet). Various types of image forming processes (e.g., an electrophotographic process or an inkjet process) may be employed as an image forming process of the print unit 30. The print unit 30 may be one of a color printer and a monochrome printer.

In the print system 100, a user is able to edit image data (e.g., data of documents, drawings, spreadsheets or photographs) through an application program installed in the PC 1, and the user is able to transmit the image data to the printer 2 to print an image corresponding to the image data.

The application programs installed into the PC 1 include programs having a print function through which a print job containing document data or image data is passed to the printer driver running on the PC 1. In response to reception of a print job from an application program, the printer driver forms print data used to print an image corresponding to the received data (e.g., document data or image data).

The print data formed by the printer driver is then transmitted to the printer 2 via the printer port interface 17. In response to receipt of the print data, the printer 2 controls the print unit 30 so that a desired image corresponding to the print data is printed on a recording medium designated by the user.

The application program obtains setting information concerning paper types which the printer 2 supports from the printer driver for the printer 2, and registers the setting information as a setting item for paper types and a setting item for paper sizes. For example, for a setting item for paper sizes, paper sizes of "A4", "A5", "B5", and "Postcard" are registered. Further, for the setting item for paper sizes, a dimension or a print direction may be registered. The application program provides a page setting screen or a preview screen in which settings designated by the user is reflected The application program also obtains, from the printer driver, function information concerning available functions which the printer driver is able to provide. The functions of the printer driver are, for example, a watermark function, a rearranging function, and a multi-page function. Different setting items are used depending on the type of the function.

For example, for the watermark function, a setting item "USE" representing use of the watermark function, a setting item "NONUSE" representing nonuse of the watermark function, and setting items ("BLACK", "GRAY", "RED", etc.) regarding colors or types of watermarks are used.

In addition to obtaining the above mentioned function information, the application program also obtains order of execution of the functions. Print results differ with respect to each other depending on the order of execution of the functions. For example, a print result formed by executing the multi-page function after the watermark function differs from a print result formed by executing the watermark function after the multi-page function. Since the application program is able to obtain the order of execution of the functions, the application program is able to provide a page setting screen or a preview screen in which settings designated by the user is appropriately reflected.

Figure 2:
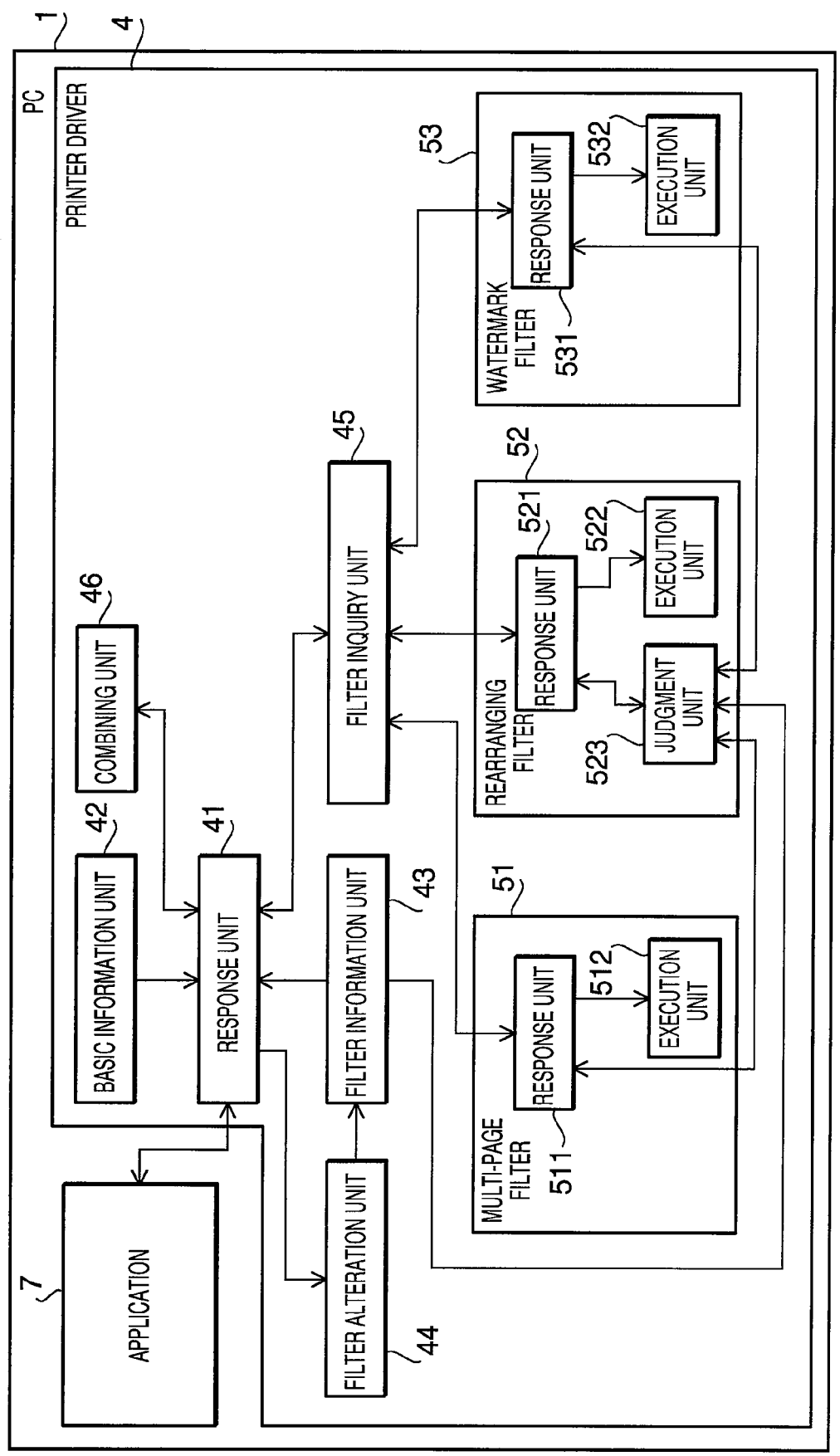
FIG. 2 illustrates a functional block diagram of a printer driver implemented on a personal computer.

Hereafter, a printer driver 4 which is one of printer drivers installed in the PC 1 for the printer 2 is explained with reference to FIG. 2. FIG. 2 illustrates a functional block diagram of the printer driver 4. The printer driver 4 is provided with software modules (e.g., DLL modules) corresponding to various functions. Hereafter, these functions of the printer driver 4 are frequently referred to as function filters. A function filter may be added to or removed from the printer driver 4 as add-in modules. The function of the function filter may be expanded by version upgrade.

As shown in FIG. 2, the printer driver 4 includes a response unit 41, a basic information unit 42, a filter information unit 43, a filter alteration unit 44, a filter inquiry unit 45, a combining unit 46, and function filters. By way of example, the printer 4 includes a multi-page filter 51 for the multi-page function, a rearranging filer 52 for the rearranging function and a watermark filter 53 for the watermark function.

The response unit 41 accepts a request from an application 7, and returns information to the application 7 in response to receipt of the request from the application 7. More specifically, the printer driver 4 receives a request for function information from the application 7. The response unit 41 obtains information concerning functions that the printer driver 4 has, and provides the obtained information for the application 7.

The basic information unit 42 stores basic function information of the printer 2. The term basic function information means functions of the printer driver 4 excepting the functions achieved by the function filters. That is, the basic function is static information regarding the functions of the printer driver 4. More specifically, the basic function relates a hardware configuration of the printer 2. For example, a paper size, paper orientation and an input tray are stored as the basic function information.

In this embodiment, the function information is stored as a XML file. However, various types of file formats, such as a HTML file or a CSV file may be used for storing the function information. FIG. 3 illustrates an example of the function information of the printer driver 4 containing only the basic function information.

The filter information unit 43 stores configuration information concerning configurations of the function filters of the printer driver 4. FIG. 4 illustrates an example the configuration information managed by the filter information unit 43. As shown in FIG. 4, the configuration information is formed as an XML file containing a list of the function filters of the printer driver 4.

More specifically, the configuration information includes, for each of the function filters, the type of the function filter and reference information to the function filter (i.e., a filter module). In the example shown in FIG. 4, each of the function filters is registered in association with a corresponding filter module name. The order of filter items registered in the configuration information shown in FIG. 4 also shows the order of execution of filter functions. More specifically, from the configuration information shown in FIG. 4, the printer driver 4 executes the watermark function, the rearranging function and the multi-page function in this order. Although the configuration information shown in FIG. 4 is formed as an XML format file, various types of file formats, such as a HTML file or a CSV file may be used as a file format for the configuration information.

The filter alteration unit 44 modifies configuration information of the function filters stored in the filter information unit 43. In this embodiment, it is possible to edit the XML file (i.e., the configuration information) managed by the filter information unit 43 so that the order of execution of function filters can be changed and addition or deletion of function filters can be achieved.

For example, the application 7 may transmit a command for modifying the configuration information through the response unit 41 to the printer driver 4, or an embedded program for version upgrade or an embedded program for add-ins may transmit a command for modifying the configuration information through the response unit 41 to the printer driver 4. The printer driver 4 may be configured to provide a user interface through which the user is allowed to modify the configuration information of the function filters.

The filter inquiry unit 45 inquires of each of the function filters 51-53 about the function information to obtain detailed information concerning the functions that the function filters 51-53 have. More specifically, before inquiring of each of the function filters 51-53 about the detailed information concerning the functions, the filter inquiry unit 45 obtains the information concerning the function filters 51-53 stored in the filter information unit 43 through the response unit 41. Then, the filter inquiry unit 45 inquires of each of the function filters 51-53 about the detailed information.

Although in the above mentioned configuration the filter inquiry unit 45 is configured to first obtain the information concerning the function filters 51-53 stored in the filter information unit 43 through the response unit 41, the filter inquiry unit 45 may be configured to obtain the information concerning the function filters 51-53 directly from the filter information unit 43.

The combining unit 46 has a function of combining a plurality of pieces of information concerning the function filters 51-53 into a piece of information. In this embodiment, a plurality of pieces of information concerning the function filters 51-53 obtained by the filter inquiry unit 45 and the information stored in the basic information unit 42 are combined to form a detailed function list of the function filters as an XML file. Then, the detained function list (i.e., an XML file) of the function filters that the printer driver 4 has is outputted to the response unit 41.

As shown in FIG. 2, the function filters 51-53 have substantially the same functional structure. Therefore, the watermark filter 53 is explained as an example of the functional structure of the function filters. The watermark filter 53 includes a response unit 531 and an execution unit 532. The multi-page filter 51 has a response unit 511 and an execution unit 512. The rearranging filter 52 has a response unit 521 and an execution unit 522.

The response unit 531 has a function of accepting a request from each of the filter inquiry unit 45 and the other filters 51 and 52 and returning information to a requesting source. Further, the response unit 531 stores the detailed information concerning the watermark filter 53. The contents of the detailed information vary depending on the type of the function filter. Regarding the watermark filter 53, various types of information including settable colors for watermarks and information on whether to use the watermark function are stored as the detailed information.

The execution unit 532 executes a watermark process in accordance with settings regarding the watermark function. For example, watermark letters are overlaid on a printed image.

There is a case where a certain function filter has a restricted function which means that the restricted function can not be achieved solely by the certain function filter having the restricted function. Therefore, the function filer having the restricted function is configured to have a judgment unit to judge whether the restricted function can be executed. For example, a booklet function which is a combination of the rearranging function and the 2-in-1 function of the multi-page filter 51, or a copying function which is a combination of the function of the multi-page filter 51 and a function of a layout filter (not shown in FIG. 1) is the restricted function.

Whether the restricted function can be achieved also depends on the order of execution of the function filters. For example, the booklet function executes the 2-in-1 function after rearranging pages. Therefore, the booklet function requires that the 2-in-1 function of the multi-page filter 51 is executed after rearranging of pages by the rearranging function. The copying function is not able to output a proper result if the process of the multi-page filter is executed after the process of the layout filter. Therefore, the copying function requires that the process of the layout function is executed after the process of the multi-page function.

The other function filters not having the restricted function is able to execute its own functions by itself, and therefore is not affected by the order of execution of the filter functions.

For this reason, the function filter having the restricted function has the judgment unit (see a judgment unit 523 in the rearranging filter 52). Since the rearranging filter 52 has the booklet function as a restricted function, the rearranging filter 52 has the judgment unit 523 to judge whether the booklet function can be executed.

More specifically, the judgment unit 523 of the rearranging filter 52 inquires of each of the response units 511 and 531 of the multi-page filter 51 and the watermark filter 53 about the functions of the function filters to judge whether the booklet function can be executed. Then, the judgment unit 523 outputs a judgment result to the response unit 521.

Figure 5:
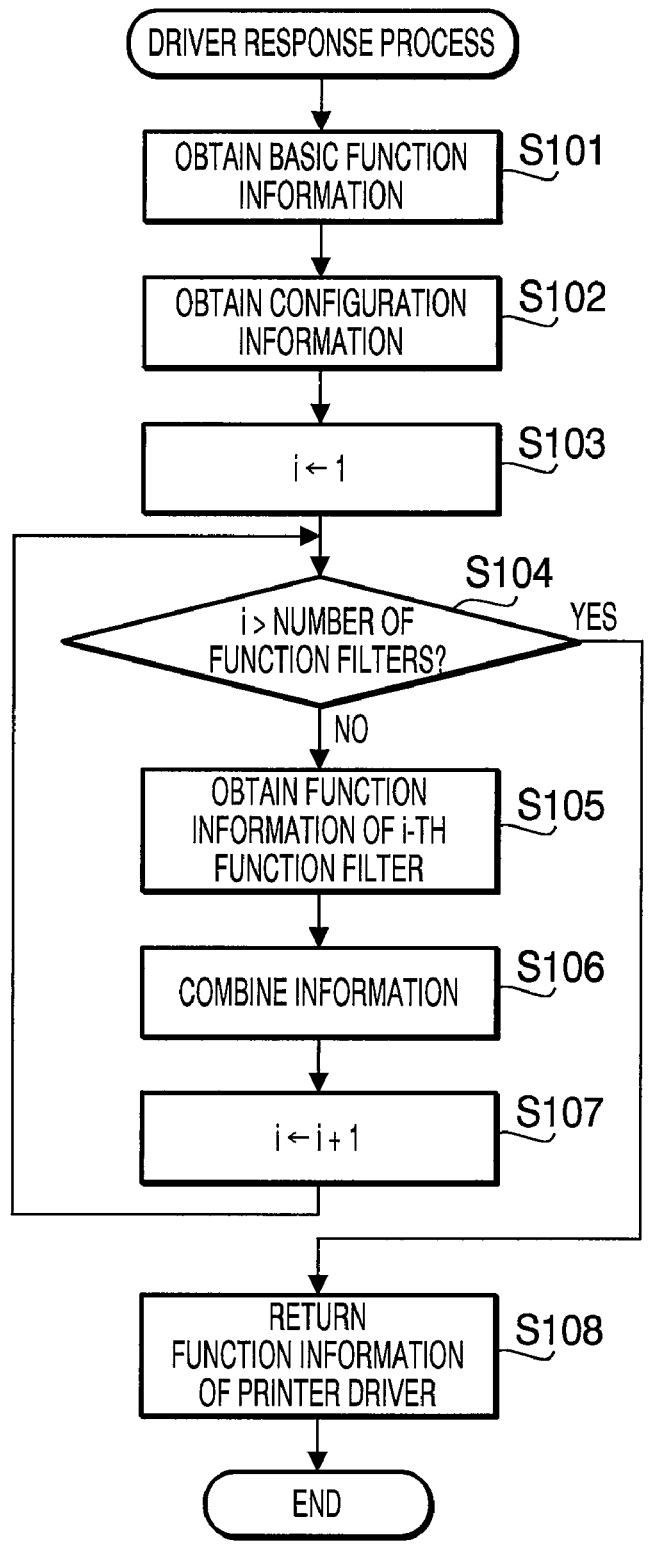
FIG. 5 is a flowchart illustrating a driver response process executed by the printer driver in response to a request from an external source.

Hereafter, a driver response process executed by the printer driver 4 in response to a request from an external source (e.g., the application 7) is explained with reference to FIG. 5. In the driver response process, the function information of the printer driver 4 is formed principally by the response unit 41, and the function information is returned to the requesting source.

First, the response unit 41 obtains the basic function information (see FIG. 3) of the printer driver 4 from the basic information unit 42 (step S101). The obtained basic function information is stored as an XML file.

Then, the response unit 41 obtains the configuration information of the function filters of the printer driver 4 (see FIG. 4) from the filter information unit 43 (step S102). The configuration information contains, for each of the function filters, a function filter name and a reference to the function filter. From the configuration information, the response unit 41 is able to obtain the number of function filters, function filter names, references to the function filters and the order of execution of the function filters.

Next, 1 is assigned to the count i (step S103). Then, it is judged whether the counter i is larger than the number of the function filters (step S1104). That is, it is judged whether all of the function filters have been processed. If the counter i is smaller than or equal to the number of function filters (i.e., there is a function filter to which an inquiry is not sent) (S104: NO), control proceeds to step S105.

In step S105, the filter inquiry unit 45 obtains a reference to the i-th function filter, and inquires of the i-th filter about the functions. Then, the filter inquiry unit 45 receives a response (i.e., the functions of the i-th filter) from the response unit of the i-th function filter. FIG. 6 illustrates an example of the information obtained from the watermark filter 53 which is the first function filter.

Then, the obtained information is added to the function information concerning the functions of the function filters of the printer driver 4 (step S106). That is, in step S106, the combining unit 46 combines a plurality of pieces of information on functions of the function filters obtained by the filter inquiry unit 45 into a piece of function information concerning the function filters of the printer driver 4. FIG. 7 illustrates an example of the function information representing a state where the functions of the watermark filter 53 are added to the basic function information.

Next, the counter i is incremented by 1 (step S107). Then, control returns to step S104. These steps S104 to S107 are repeated until the counter i becomes larger than the number of function filters. That is, steps S104 to S107 are repeated until all the function filters are processed. FIG. 8 illustrates an example of the function information in a state where the information has been obtained from all of the function filters (i.e., the function filters 51-53 in this embodiment).

When all of the function filters have been processed (S104: YES), control proceeds to step S108 where the response unit 41 returns the function information concerning the functions of the printer driver 4 to the requesting source (e.g., the application 7). Then, the driver response process terminates.

The application 7 is able to extract a list of function filters of the printer driver 4 and the details of the function filters of the printer driver 4 from the obtained function information. Even if the configuration of the function filters is modified, it is possible to follow the change of the configuration of the function filters because the filter inquiry unit 45 inquires of each of the function filters each time an inquiry from the application 7 is received. For example, even if a new function filter is added to the printer driver 4, the printer driver 4 is able to provide the function information reflecting the information regarding the newly added function filter. In other words, the application 7 is able to obtain proper information reflecting current configuration of the function filters of the printer driver 4 even if the application inquires of the printer driver about the function information after the new function filter is added to the printer driver 4.

Figures 9, 10:
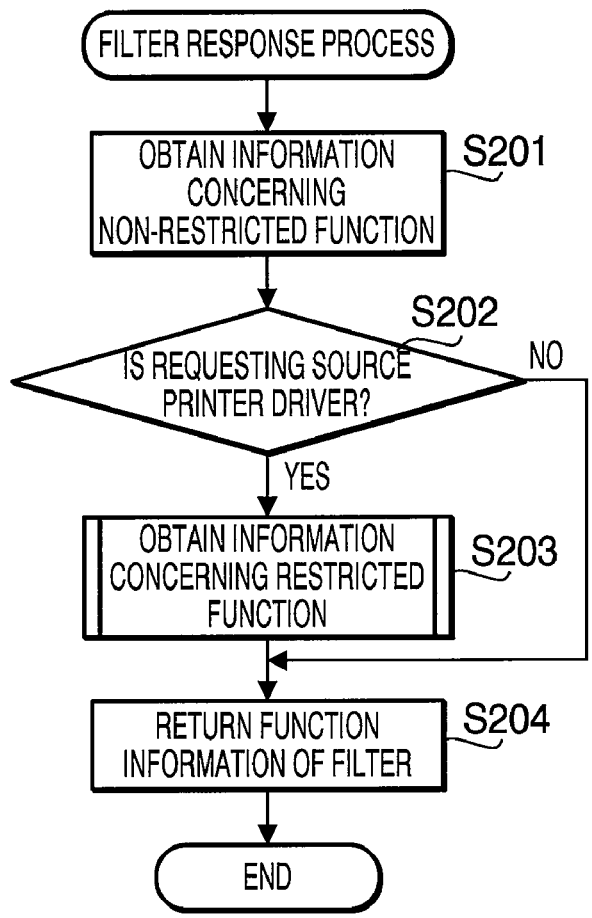
FIG. 9 is a flowchart illustrating a filter response process executed by each function filter to respond to an inquiry about the functions.
FIG. 10 illustrates an example of the function information of the function filter.

Hereafter, a filter response process executed by each function filter to respond to an inquiry about the functions is explained with reference to FIG. 9. Since the substantially the same process is executed in the function filters 51-53, the filter response process of the rearranging filter 52 is explained as a representative example. As described below, in the filter response process, the function information concerning the functions of the function filter is formed principally by the response unit 521, and the function information is returned to a requesting source.

First, the response unit 521 obtains the information concerning the non-restricted function of the rearranging filter 52 (step S201). The information concerning the non-restricted function is then stored as the function information of the rearranging filter 52. In this embodiment, the function information is stored as an XML file. However, various types of file formats, such as, a HTML file and a CSV file, may be used to store the function information. FIG. 10 illustrates an example of the function information of the function filter.

Next, the response unit 521 judges whether a requesting source of the inquiry is the printer driver 4 (i.e., the filter inquiry unit 45) (step S202). It should be note that there is a case an inquiry about the function of the function filter is issued by one of the other function filers 51 and 53. The contents of the response outputted by the function filter vary depending on the type of the requesting source.

If the requesting source is the printer driver 4 (i.e., the filter inquiry unit 45) (S202: YES), the information concerning the restricted function is obtained (step S203). As described in detail below, the process for obtaining the information concerning the restricted function varies depending on the type of function filter and the type of the function of the function filter. After the information concerning the restricted function is obtained, control proceeds to step S204. If the requesting source is not the printer driver 4 (S202: NO), control proceeds to step S204 without obtaining the information concerning the restricted function.

In step S204, the response unit 521 returns the function information to the requesting source. Then, the filter response process terminates.

Figures 11, 12:
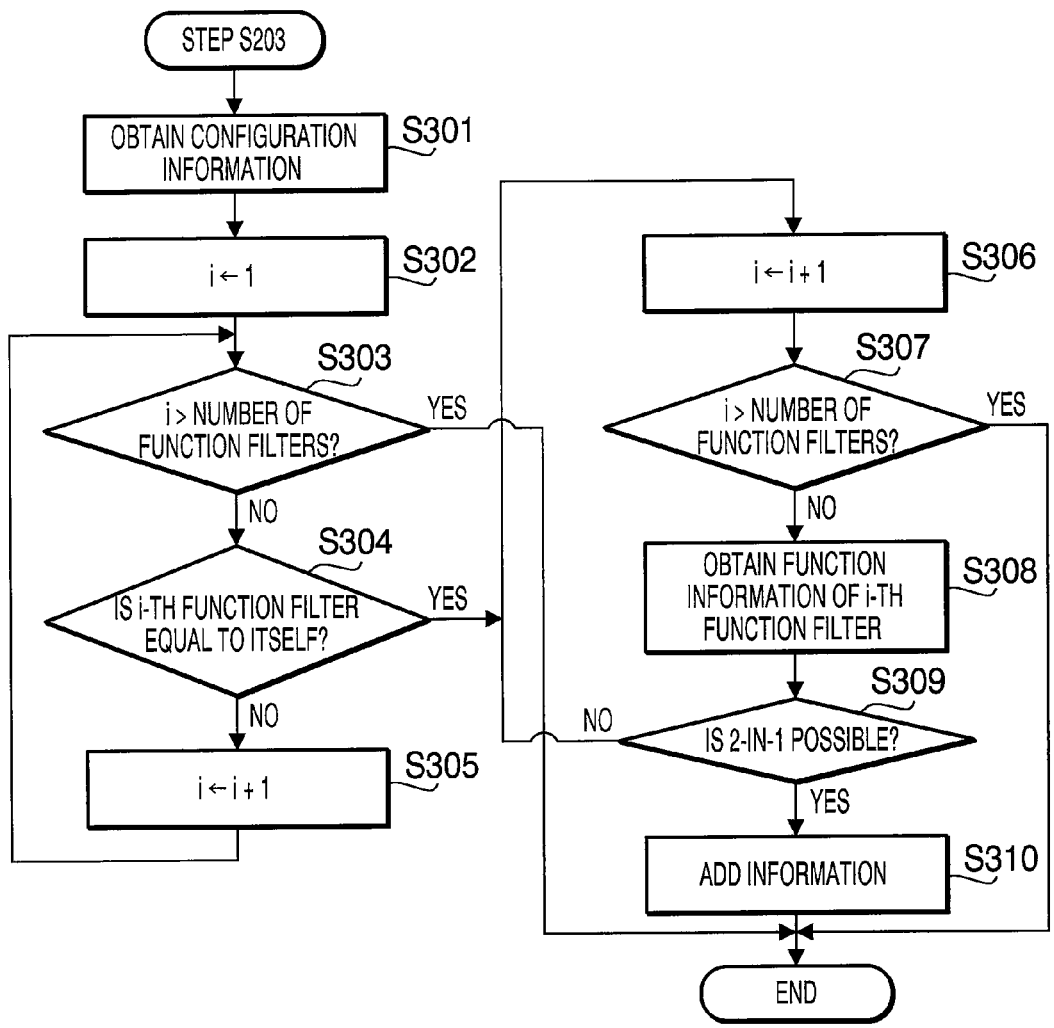
FIG. 11 is a flowchart illustrating a restricted function check process executed the filter response process.
FIG. 12 illustrates a state where a booklet function is added to the function information.

Hereafter, a restricted function check process executed in step S203 of the filter response process is explained with reference to FIG. 11. By way of example, it is assumed that the restricted function check process is processed for the booklet function of the rearranging filter 52 requiring the process of the 2-in-1 function to be executed after the process of the rearranging.

First, the configuration information concerning the function filters of the printer driver 4 is obtained (step S301). More specifically, the judgment unit 523 of the rearranging filter 52 obtains the configuration information from the filter information unit 43.

Then, 1 is assigned to the counter i (step S302). Then, it is judged whether the counter i is larger than the number of function filters (step S303). That is, in step S303, it is judged whether all of the function filters have been processed. If the counter i is smaller than or equal to the number of function filters (i.e., if there is an unprocessed function filter to which an inquiry has not been sent) (S303: NO), control proceeds to step S304.

In step S304, it is judged whether the i-th function filter is equal to itself (i.e., the rearranging filter 52). By step S304, the number that the rearranging filter 52 is executed is determined. If the i-th function filter is not equal to itself (S304: NO), the counter i is incremented (step S305). Then, control returns to step S303. On the other hand, if the i-th function filter is equal to itself (S304: YES), control proceeds to step S306.

It should be noted that if a function filter equal to itself is not found, the judgment result of step S303 becomes "YES", and in this case the restricted function check process terminates. In this case, a message indicating that a function filter equal to itself is not found may be returned to the response unit 521.

If the function filter equal to itself is found (S304:YES), the counter i is incremented (step S306). Then, it is judged whether the counter i is larger than the number of function filters (step S307). That is, in step S307, it is judged whether all of the function filters have been inquired. If the counter i is smaller than or equal to the number of function filters (i.e., there is a function filter to which an inquiry has not been sent) (S307: NO), control proceeds to step S308.

In step S308, the judgment unit 523 inquires the i-th function filter about the functions, and receives the function information from the i-th function filter. Thus, the judgment unit 521 obtains the function information of the i-th function filter.

Then, the judgment unit 523 judges whether the function information of the i-th function filter contains the 2-in-1 function (step S309). If the function information of the i-th function filter does not contain the 2-in-1 function (S309: NO), control returns to step S306 to inquire of the next function filter about the function. If the 2-in-1 function is not found until the last function filter is reached (S307: YES), the restricted function check process terminates.

If the i-th function filter has the 2-in-1 function (S309: YES), the judgment unit 523 judges that the booklet function can be executed because in this case it is possible to execute the 2-in-1 function after executing the rearranging function. Therefore, in this case, the booklet function is added to the function information of the rearranging filter 52 (step S310). FIG. 12 illustrates a state where the booklet function is added to the function information of the rearranging filter 52. After step S310 is processed, the restricted function check process terminates.

The filter inquiry unit 45 obtains the above mentioned function information from the rearranging filter 52. From the obtained function information, the filter inquiry unit 45 is able to extract a list of functions of the rearranging filter 52 and the details of the functions of the rearranging filter 52. Since the information concerning the restricted function is obtained by inquiring of the other function filters about relevant functions that the other function filters have, the function information properly reflects the information concerning the restricted function. Consequently, the proper function information reflecting the current functions of the function filters is obtained.

As described above, the printer driver 4 has a plurality of function filters. The configuration information containing the list of the function filters of the printer driver 4 is stored in the filter information unit 43. The filter inquiry unit 45 inquires of each of the function filters 51-53 about the functions to obtain the function information of the function filter. The response unit 41 returns the function information obtained by the filter inquiry unit 45 to a requesting source.

The application 7 receives the function information provided by the printer driver 4. Therefore, the application 7 is able to obtain the current function information of the printer driver 4. Each time the printer driver receives a request for the function information, the printer driver 4 inquires of each of the function filters about the function based on the configuration information. Therefore, it is possible to provide the proper function information reflecting the current functions of the function filters of the printer driver 4.

The response unit 41 of the printer driver 4 outputs the information combined by the combining unit 46. Therefore, the application 7 is able obtain the function information concerning the plurality of function filters by receiving a piece of data.

The rearranging filter 52 has the judgment unit 523 capable of judging by itself whether the booklet function (i.e., the restricted function) can be executed. If the booklet function can not be executed, the rearranging filter 52 does not return the information concerning the booklet function. Therefore, the application 7 obtains the proper function information reflecting the current functions of the printer driver 4.

It is possible to modify the information in the filter information unit 43 through the filter alteration unit 44. By updating the information stored in the filter information unit 43 when the configuration of the function filters is modified, it is possible to return the proper function information reflecting the current functions of the function filters to a requesting source.

In the basic information unit 42, the basic function information is stored as an XML format which is equal to an output format of the response unit 41. Such a configuration makes it possible to decrease the burden on preparing of response data of the basic functions and thereby to quickly respond to a request from the application 7.

Although the present invention has been described in considerable detail with reference to certain preferred embodiments thereof, other embodiments are possible.

In the above mentioned embodiment, the printer 2 is employed in the print system 100. However, various types of image formation devices, such as a copying device, a facsimile device or a multifunction device having an image formation function may be employed in place of the printer 2. Various types of information processing devices, such as, a workstation or a portable device, may be employed in the print system 100 in place of the PC 1.

In the above mentioned embodiment, the image formation device (printer 2) and the information processing device (the PC 1) are provided as separate devices. However, the image formation device and the information processing device may be integrated into a single device.

What is claimed is:

1. A method for providing information from a printer driver, comprising the steps of:
    accepting a request for information concerning the printer driver;
    in response to the request:
        obtaining configuration information including a list of one or more function filters, wherein for each of the one or more function filters, the configuration information stores a corresponding reference;
        inquiring about function information from at least one function filter of a plurality of function filters in accordance with a reference to the at least one function filter stored in the configuration information;
        obtaining, from the at least one function filter, the function information including at least one current function of the at least one function filter, as a result of the inquiring;
        determining whether the obtained at least one current function is a restricted function requiring performance of a first function and a second function, wherein the first function corresponds to the at least one function filter and the second function corresponds to at least another function filter;
        determining whether the obtained at least one current function is executable based on function information obtained for the second function from the at least another function filter if the obtained at least one current function is the restricted function; and
    providing the obtained function information for the at least one function filter and the at least another function filter to a requesting source of the request, wherein the obtained function information includes a result of the determining whether the at least one current function is executable.

2. The method according to claim 1,
    wherein the method further comprises the step of combining the function information obtained from the at least one function filter and the function information obtained from the at least another function filter into a piece of information,
    wherein, in the step of providing, the combined piece of information is provided to the requesting source.

3. The method according to claim 1, further comprising the steps of:
    processing print data; and
    outputting the function information including the at least one current function as a further result of the inquiring,
    wherein the steps of processing and outputting are implemented in the at least one function filter.

4. The method according to claim 1,
    wherein the restricted function requires performance of the second function after performance of the first function, and
    wherein determining whether the at least one current function is executable is performed based on a predefined order of execution of the plurality of function filters specified in the configuration information.

5. The method according to claim 1,
    wherein the plurality of function filters include:
        a rearranging function filter having a function of rearranging printing order of pages of print data; and
        a multi-page function filter having a function of allocating a plurality of pages of print data to a single page of print data,
    wherein determining whether the at least one current function is executable comprises judging that a booklet function is executable if the multi-page function filter includes a 2-in-1 function and the rearranging function is executed before execution of the multi-page function filter.

6. The method according to claim 1, further comprising the step of changing contents of the configuration information.

7. The method according to claim 1, wherein the step of providing further includes providing basic function information of the printer driver to the requesting source of the request.

8. A non-transitory computer readable medium having computer readable instructions stored thereon, which, when executed by a processor of an information processing device, cause the information processing device to perform the steps of:
    accepting a request for information concerning a printer driver;
    in response to the request:
        obtaining configuration information including a list of one or more function filters, wherein for each of the one or more function filters, the configuration information stores a corresponding reference;
        inquiring about function information from at least one function filter of a plurality of function filters in accordance with a reference to the at least one function filter;
        obtaining, from the at least one function filter, the function information including at least one current function of the at least one function filter, as a result of the inquiring;
        determining whether the obtained at least one current function is a restricted function requiring performance of a first function and a second function, wherein the first function corresponds to the at least one function filter and the second function corresponds to at least another function filter;
        determining whether the obtained at least one current function is executable based on function information obtained for the second function from the at least another function filter if the obtained at least one current function is the restricted function; and providing the obtained function information for the at least one function filter and the at least another function filter to a requesting source of the request, wherein the obtained function information includes a result of the determining whether the at least one current function is executable.

9. The computer readable medium according to claim 8, wherein the instructions, when executed, further scause the information processing device to combine the function information obtained from the at least one function filter and the function information obtained from the at least another function filter into a piece of information, and wherein the step of providing including providing the combined piece of information to the requesting source.

10. The computer readable medium according to claim 8, wherein the instructions, when executed, further cause the
information processing device to perform the steps of:
processing print data; and
outputting the function information including the at least one current function as a further response to the inquiring,
wherein the steps of processing and outputting are implemented in one or more of: the at least one function filter and the at least another function filter.

11. The computer readable medium according to claim 8, wherein determining whether the at least one current function is executable is performed further based on an order of execution of the plurality of function filters.

12. The computer readable medium according to claim 8, wherein the plurality of function filters include:
a rearranging function filter having a function of rearranging printing order of pages of print data; and
a multi-page function filter having a function of allocating a plurality of pages of print data to a single page of print data,
wherein determining whether the at least one current function is executable comprises judging that a booklet function is executable if the multi-page function filter has a 2-in-1 function and the rearranging function is executed before execution of the multi-page function filter.

13. The computer readable medium according to claim 8, wherein the instructions, when executed, further cause the information processing device to perform the step of changing contents of the configuration information.

14. The computer readable medium according to claim 8, wherein the step of providing includes providing basic function information of the printer driver to the requesting source of the request.

15. An information processing device, comprising:
a processor; and
memory storing computer readable instructions that, when executed, cause the information processing device to:
accept a request for information concerning a printer driver;
in response to the request:
obtain configuration information including a list of one or more function filters, wherein for each of the one or more function filters, the configuration information stores a corresponding reference;
inquire about function information from at least one function filter in accordance with a reference to the at least one function filter stored in the configuration information;
obtain, from the at least one function filter, the function information including at least one current function of the at least one function filter, as a result of the inquiring;
determine whether the obtained at least one current function is a restricted function requiring performance of a first function and a second function, wherein the first function corresponds to the at least one function filter and the second function corresponds to at least another function filter;
determine whether the obtained at least one current function is executable based on function information obtained for the second function from the at least another function filter if the obtained at least one current function is the restricted function; and
provide the obtained function information for the at least one function filter and the at least another function filter to a requesting source of the request, wherein the obtained function information includes a result of the determining whether the at least one current function is executable.

16. The information processing device according to claim 15,
wherein determining whether the at least one current function is executable is performed further based on an order of execution of the plurality of function filters.

17. The information processing device to claim 15,
wherein the plurality of function filters include:
a rearranging function filter having a function of rearranging printing order of pages of print data; and
a multi-page function filter having a function of allocating a plurality of pages of print data to a single page of print data,
wherein determining whether the at least one current function is executable includes determining that a booklet function is executable if the multi-page function filter has a 2-in-1 function and the rearranging function is executed before execution of the multi-page function filter.

\* \* \* \* \*

UNITED STATES PATENT AND TRADEMARK OFFICE
CERTIFICATE OF CORRECTION

| | |
|---|---|
| PATENT NO. | : 8,368,905 B2 |
| APPLICATION NO. | : 12/128668 |
| DATED | : February 5, 2013 |
| INVENTOR(S) | : Yuji Miyata |

It is certified that error appears in the above-identified patent and that said Letters Patent is hereby corrected as shown below:

In the Claims
Column 12, Claim 8, Line 66:
   Delete "determining whether the obtained at least one" and insert --determining whether the at least one--

Signed and Sealed this
Eighth Day of April, 2014

Michelle K. Lee
*Deputy Director of the United States Patent and Trademark Office*